US012624199B2

(12) United States Patent
Lim et al.

(10) Patent No.: US 12,624,199 B2
(45) Date of Patent: May 12, 2026

(54) BIODEGRADABLE RESIN COMPOSITION AND METHOD FOR PRODUCING SAME

(71) Applicant: HANWHA SOLUTIONS CORPORATION, Seoul (KR)

(72) Inventors: Yu Jeong Lim, Daejeon (KR); Yu Jeong Jeong, Daejeon (KR); Jeong Hyun Park, Daejeon (KR); Jae Kyu Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 970 days.

(21) Appl. No.: 17/781,916

(22) PCT Filed: Oct. 19, 2020

(86) PCT No.: PCT/KR2020/014258
§ 371 (c)(1),
(2) Date: Jun. 2, 2022

(87) PCT Pub. No.: WO2021/112397
PCT Pub. Date: Jun. 10, 2021

(65) Prior Publication Data
US 2023/0014582 A1 Jan. 19, 2023

(30) Foreign Application Priority Data

Dec. 5, 2019 (KR) ........................ 10-2019-0160636

(51) Int. Cl.
C08L 23/06 (2006.01)
C08F 222/06 (2006.01)
(Continued)

(52) U.S. Cl.
CPC ............ C08L 23/06 (2013.01); C08F 222/06 (2013.01); C08G 63/183 (2013.01); C08L 3/02 (2013.01);
(Continued)

(58) Field of Classification Search
CPC ........ C08L 23/06; C08L 3/02; C08L 2201/06; C08L 2203/16; C08L 2203/30;
(Continued)

(56) References Cited

U.S. PATENT DOCUMENTS

2012/0315454 A1 12/2012 Wang et al.
2014/0199557 A1 7/2014 Naito et al.

FOREIGN PATENT DOCUMENTS

CN 102115576 A 7/2011
CN 106349631 A 1/2017
(Continued)

OTHER PUBLICATIONS

English Translation of CN110511544 (Year: 2019).*
(Continued)

*Primary Examiner* — Catherine S Branch
*Assistant Examiner* — Andrea Wu
(74) *Attorney, Agent, or Firm* — Sughrue Mion, PLLC

(57) ABSTRACT
A biodegradable resin composition and a method for producing the biodegradable resin composition are disclosed. The biodegradable resin includes three components, polyethylene, a biodegradable resin, and at least one selected from polybutylene adipate terephthalate and maleic anhydride copolymer, thereby providing excellent compatibility and mechanical properties.

13 Claims, 1 Drawing Sheet

(51) Int. Cl.
     *C08G 63/183*     (2006.01)
     *C08L 3/02*     (2006.01)

(52) U.S. Cl.
     CPC ....... *C08L 2201/06* (2013.01); *C08L 2203/16* (2013.01); *C08L 2203/30* (2013.01); *C08L 2205/03* (2013.01); *C08L 2207/062* (2013.01); *C08L 2207/066* (2013.01)

(58) Field of Classification Search
     CPC ........... C08L 2205/03; C08L 2207/062; C08L 2207/066; C08F 222/06; C08G 63/183
     See application file for complete search history.

(56)            References Cited

FOREIGN PATENT DOCUMENTS

| CN | 109880183 | A | 6/2019 |
| CN | 110511544 | A | 11/2019 |
| JP | 2007-520591 | A | 7/2007 |
| JP | 2008-213870 | A | 9/2008 |
| JP | 2013-067128 | A | 4/2013 |
| JP | 2017-513974 | A | 6/2017 |
| JP | 2023-504656 | A | 2/2023 |
| KR | 10-2003-0071056 | A | 9/2003 |
| KR | 10-2017-0073819 | A | 6/2017 |
| KR | 10-2017-0075052 | A | 7/2017 |
| KR | 20170075052 | A * | 7/2017 | .............. C08K 3/22 |
| KR | 10-2018-0023037 | A | 3/2018 |
| KR | 10-2019-0067320 | A | 6/2019 |
| WO | 2015/155198 | A1 | 10/2015 |

OTHER PUBLICATIONS

English translation of KR20170075052 (Year: 2017).*
Extended European Search Report dated Nov. 3, 2023 in Application No. 20895995.7.
International Search Report for PCT/KR2020/014258, dated Jan. 22, 2021.

* cited by examiner

BIODEGRADABLE RESIN COMPOSITION AND METHOD FOR PRODUCING SAME

CROSS REFERENCE TO RELATED APPLICATIONS

This application is a National Stage of International Application No. PCT/KR2020/014258 filed Oct. 19, 2020, claiming priority based on Korean Patent Application No. 10-2019-0160636 filed Dec. 5, 2019.

TECHNICAL FIELD

The present invention relates to a biodegradable resin composition and a method for producing the same, and more particularly, to a technique for providing a biodegradable resin including three components, polyethylene, a biodegradable resin, and at least one selected from polybutylene adipate terephthalate and maleic anhydride copolymer, thereby providing excellent compatibility and mechanical properties.

BACKGROUND ART

Since plastic has excellent physical properties and cheap and light characteristics, various polymers have been developed centering on plastic beyond the limits of natural materials to built a modern scientific civilization. Plastic is characterized by being strong, light and tough and not easily decomposing. Due to these properties, plastic is used in various ways from industrial materials to disposable materials. Research has been conducted for a long time to further improve the toughness and durability of synthetic resins such as plastic, and these efforts are still ongoing. However, environmental pollution caused by plastic waste that is getting serious is a problem. For example, due to the detection of highly toxic dioxins, the leakage of environmental hormones, and the like, not only the social demand for eco-friendly plastic but also the standards of each country's legal regulations on the use of non-degradable plastic are getting stronger. In order to solve this problem, the development of biodegradable polymers is being treated as a very important matter, and is attracting attention as an important field in the plastic industry.

In general, according to the American Society for Testing and Materials (ASTM), degradable plastic refers to plastic whose chemical structure is significantly changed for a certain period of time under specific environmental conditions, so that the change in properties may be measured by standard test methods. Degradable plastic may be divided into photodegradable plastic, biodestructible plastic, and biodegradable plastic.

More specifically, photodegradable plastic refers to plastic that is decomposed by light in the form of photooxidation or ketone photolysis. However, since photodegradable plastic is decomposed by light, there is a disadvantage in that photodegradable plastic is not decomposed when buried in the ground where light is blocked. Biodestructible plastic refers to partially degradable plastic produced by adding a certain amount of biodegradable material such as starch to non-degradable general-purpose resin (polyethylene, polypropylene, etc.). In Korea, in order to avoid confusion with biodegradable plastic, the term "biodestructible plastic" is used to distinguish from biodegradable plastic. Biodegradable plastic generally refers to plastic that is completely decomposed by itself into water and carbon dioxide or water and methane gas by microorganisms present in nature, such as bacteria, algae, and mold.

In the past, photodegradable plastic or biodestructible plastic has been mainly used. Recently, the development of biodegradable plastic has been treated as an important issue. Biodegradable plastic distinguishes from the existing petroleum-based plastic because of the use of natural plant resources in terms of the raw material, and may provide cleanliness that is completely decomposed into only water and carbon dioxide by microorganisms in nature. Therefore, it is a global trend to develop biodegradable plastic as mainstream.

On the other hand, when a biodegradable resin is included in order to improve biodegradability, compatibility with thermoplastic plastic is mainly a problem. In the case of starch as an example of a biodegradable resin, compatibility can be solved by changing physical properties by introducing a substituent to hydroxy (—OH) or by applying a method of generating a radical and copolymerizing with a vinyl-based monomer. However, in this case, there is somewhat limitation in that it is difficult to provide a satisfactory level of compatibility or biodegradability. Recently, various technologies are being developed to enhance compatibility and improve biodegradability and mechanical properties.

For example, Korean Patent Publication No. 10-2018-0023037 discloses a thermoplastic film composition including a polymer blend of an immiscible polymer component. The composition includes a plasticized natural polymer, a polyolefin, a biodegradable polymer, and a compatibilizing agent in the same polymer molecule. A plasticized natural component and a biodegradable polymer component form a majority phase, and a petroleum-based olefin polymer forms a minority phase. It is also mentioned that the composition can be produced into a film including a renewable natural polymer component.

As another example, Korean Patent Publication No. 10-2017-0075052 discloses a resin composition for a mulching film and a film therefor, wherein the resin composition for a mulching film includes: (i) a biodegradable resin; (ii) starch in which at least one of hydroxyl groups (—OH groups) of a glucose unit is hydrophobized with a silane; and (iii) one or more compatibilizing agents selected from the group consisting of a graft copolymer in which maleic anhydride (MA) is grafted on a biodegradable polymer, an epoxidized oil, and a multifunctional compound having an epoxy group. Accordingly, the processability and mulching functionality of the film may be improved, and the tensile strength and tensile elongation of the film are improved.

Lastly, Korean Patent Publication No. 10-2003-0071056 discloses a biodegradable masterbatch resin composition, a method for producing the same, and a film including the same, wherein the biodegradable masterbatch resin composition includes a biodegradable aliphatic polyester resin, starch, a polyethylene resin, a diisocyanate or maleic anhydride binder, and a vinylsilane-based compound. Therefore, it is possible to provide a biodestructible film that has excellent molding processability and mechanical properties by dispersing starch without using a plasticizer, has excellent kneading properties with general-purpose resins by increasing binding properties through graft polymerization of high-density polyethylene resin and starch contained in the resin, and thus has excellent mechanical properties.

As described above, various studies are being conducted on degradable resins to provide excellent compatibility and biodegradability and improved mechanical properties by providing various compositions, and research and development thereon is still needed. The present invention has also been completed after a long research in order to satisfy these requirements.

(Patent Literature 1) Korean Patent Publication No. 10-2018-0023037 (2018 Mar. 6.)

(Patent Literature 2) Korean Patent Publication No. 10-2017-0075052 (2017 Jul. 3.)

(Patent Literature 3) Korean Patent Publication No. 10-2003-0071056 (2003 Sep. 3.)

DESCRIPTION OF EMBODIMENTS

Technical Problem

The present invention aims to solve the above-described problems.

An object of the present invention is to improve the dispersibility and compatibility of a biodegradable resin composition.

An object of the present invention is to improve the mechanical properties of a film including a biodegradable resin composition.

An object of the present invention is to provide a film including the biodegradable resin composition so as to be applied to various fields such as industrial, food, and agricultural fields.

Solution to Problem

In order to achieve the above-described objects of the present invention and achieve the characteristic effects of the present invention described below, the characteristic construction of the present invention is as follows.

According to an embodiment of the present invention, there is provided a biodegradable resin composition including 10-70 wt % of polyethylene, 10-60 wt % of a biodegradable resin, and 10-50 wt % of at least one selected from polybutylene adipate terephthalate and maleic anhydride copolymer.

According to an embodiment of the present invention, there is provided a biodegradable film including the resin composition. The film may be applicable to at least one selected from industrial films, food films, agricultural films, and daily life films.

According to an embodiment of the present disclosure, there is provided a method for producing a biodegradable resin composition, the biodegradable resin composition including 10-70 wt % of polyethylene, 10-60 wt % of a biodegradable resin, and 10-50 wt % of at least one selected from polybutylene adipate terephthalate and maleic anhydride copolymer, the biodegradable resin composition being produced by melt blending.

According to an embodiment of the present invention, the melt blending may be carried out at 160° C. to 210° C., and may use at least one selected from an extruder, a kneader, a Brabender Plasticorder, a mixing roll, and a mixer.

Advantageous Effects of Disclosure

A biodegradable resin composition according to the present invention provides a three-component blend resin to improve dispersibility and compatibility. Therefore, the present invention provides an effect of improving the mechanical properties of a film including the biodegradable resin composition.

A film including the biodegradable resin composition according to the present invention can be applied to various fields such as industrial, food, and agricultural fields, and can be expected to contribute to solving environmental problems by providing excellent biodegradability as well as mechanical properties.

BEST MODE

Hereinafter, the structure and operation of the present invention will be described in more detail with reference to preferred examples of the present invention. However, these examples are shown by way of illustration and should not be construed as limiting the present invention in any sense.

Since contents not described herein can be sufficiently technically inferred by those of ordinary skill in the art, descriptions thereof will be omitted.

Example 1

65 wt % of LLDPE (M2010EA available from Hanwha Chemical), 7.5 wt % of PBAT (SOLPOL-1000 available from GIOSOLTEC), 7.5 wt % of MA-PBAT (Hanwha Chemical, self-produced with an extruder by including dicumyl peroxide after adding MA to PBAT), and 20 wt % of TPS (Bionyl available from Daesang) were mixed to produce a mixture as shown in Table 1 below.

The produced mixture was placed in an extruder and heated at a mixing zone temperature of 190° C. to produce a biodegradable resin composition. The biodegradable resin composition was immediately extruded to produce a blown film. In this case, blown film processing conditions were a screw of 40 mmϕ, a die of 75 mmϕ, and a die gap of 2 mm. A screw speed was 180 rpm.

Example 2

The same as Example 1 was performed except that 15 wt % of MA-PBAT (produced by Hanwha Chemical) was included and PBAT was not included.

Comparative Example 1

The same as Example 1 was performed except that 15 wt % of PBAT was included and MA-PBAT was not included.

Comparative Example 2

100% of PBAT and a polylactic acid (PLA) blend resin was included.

TABLE 1

| Classification | Example 1 | Example 2 | Comparative Example 1 | Comparative Example 2 |
|---|---|---|---|---|
| LLDPE | 65 | 65 | 65 | — |
| PBAT | 7.5 | — | 15 | — |
| MA-PBAT | 7.5 | 15 | — | — |

TABLE 1-continued

| Classification | Example 1 | Example 2 | Comparative Example 1 | Comparative Example 2 |
|---|---|---|---|---|
| PBAT/PLA BLEND | — | — | — | 100 |
| TPS | 20 | 20 | 20 | — |

Experimental Example 1

Figure 1:
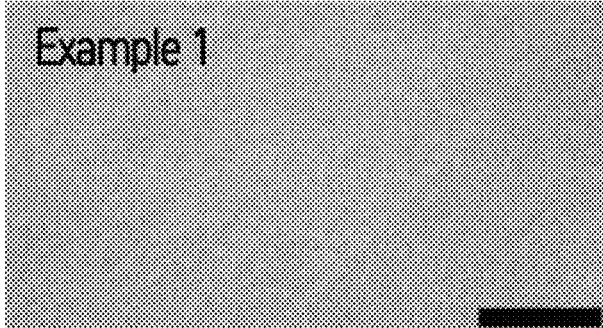
FIG. 1 is a video meter system (VMS) (measurement magnification ×160) results confirming the dispersion according to Example 1.
Figure 2:
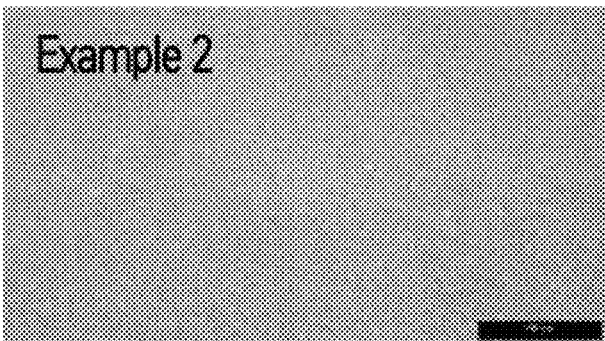
FIG. 2 is a VMS (measurement magnification ×160) results confirming the dispersion according to Example 2.
Figure 3:
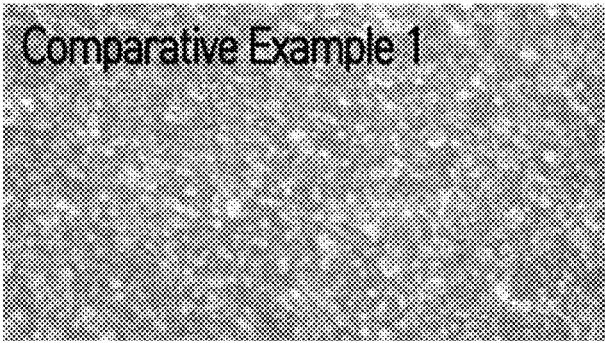
FIG. 3 is a VMS (measurement magnification ×160) results confirming the dispersion according to Comparative Example 1.

In order to confirm the compatibility and dispersibility of the biodegradable resins of Examples 1 and 2 and Comparative Example 1 having the composition ratios shown in Table 1, a video meter system (VMS) (measurement magnification ×160) was measured. Results thereof are shown in Table 2. Results thereof are shown in FIGS. 1 to 3.

Experimental Example 2

Mechanical properties of the films of Examples 1 and 2 and Comparative Examples 1 and 2 having the composition ratios shown in Table 1 were measured.

In order to measure the mechanical properties, an experiment was conducted with tensile strength during fracture test (ASTM D882), tensile elongation during fracture test (ASTM D882), Elmendorf tear strength (ASTM D1004), and dart drop impact test (ASTM D1709). Results thereof are shown in Table 2.

TABLE 2

| Physical properties of film | | Unit | Example 1 | Example 2 | Comparative Example 1 | Comparative Example 2 |
|---|---|---|---|---|---|---|
| Tensile strength | MD | Kg/cm$^2$ | 330 | 370 | 330 | 450 |
| | TD | Kg/cm$^2$ | 160 | 200 | 120 | 230 |
| Elongation | MD | % | 340 | 310 | 350 | 60 |
| | TD | % | 350 | 500 | 410 | 330 |
| Tear strength | MD | g | 290 | 440 | 200 | 100 |
| | TD | g | 850 | 1020 | 790 | 140 |
| Drop impact strength | Low place | g | 60 | 170 | 20 | 100 |

In the case of FIGS. 1 and 2, which could confirm the compatibility and dispersibility according to the present invention, it can be confirmed that the dispersibility was improved and the compatibility was improved, compared to FIG. 3 of Comparative Example.

Referring to the results of Table 2 according to the present invention, in the case of Examples, it can be confirmed that the tensile strength, tear strength, and drop impact strength values were excellent, compared to Comparative Example 1. In particular, it can be confirmed that the tensile strength was significantly improved.

In addition, it can be confirmed that the elongation, tear strength, and drop impact strength were improved, compared to Comparative Example 2. Furthermore, it can be confirmed that dispersibility and mechanical properties were improved due to the increase in the amount of maleic anhydride (MA-PBAT) in which polybutylene adipate terephthalate (PBAT) was copolymerized.

According to the invention, it can be confirmed that the compatibility is improved by providing a resin composition including three components of polyethylene, a biodegradable resin, polybutylene adipate terephthalate, and maleic anhydride copolymer blend resin, and the mechanical properties of the film including the same can be improved. In addition, an improved biodegradability effect can be provided.

Moreover, the film including the biodegradable resin composition according to the present invention can be applied to various fields such as industrial, food, and agricultural fields, and can be expected to contribute to solving environmental problems by providing excellent biodegradability.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

MODE OF DISCLOSURE

Reference is made to the accompanying drawing which shows, by way of illustration, specific embodiments in which the present invention may be practiced. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it will be understood that the locations or arrangement of individual components in the disclosed embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, preferred embodiments of the present invention will be described in detail with reference to the accompanying drawing, so that those of ordinary skill in the art can easily carry out the present invention.

"Biodegradable" in the present invention means plastic that is decomposed into water and $CO_2$ or $CH_4$ by microorganisms such as bacteria, algae, and mold. It means that the molecular weight is reduced by cutting the main chain of the polymer as well as the physical breakdown of molded products such as plastic.

According to an embodiment of the present invention, a biodegradable resin composition is provided through a compound combination of three components including polyethylene, a biodegradable resin, and at least one selected from polybutylene adipate terephthalate (PBAT) and maleic anhydride copolymer.

Although polyethylene is inexpensive and has excellent mechanical properties and processability, it is a major cause of environmental pollution due to its non-degradable properties. Therefore, the present invention provides a biodegradable resin in order to provide biodegradability while maintaining excellent mechanical properties and processability of polyethylene. In addition, in order to improve the mechanical properties by improving the dispersibility and compatibility of the composition in the resin, at least one selected from polybutylene adipate terephthalate and maleic anhydride copolymer may be included.

According to an embodiment of the present invention, there is provided a biodegradable resin composition including 10-70 wt % of polyethylene, 10-60 wt % of a biodegradable resin, and 10-50 wt % of at least one selected from polybutylene adipate terephthalate and maleic anhydride copolymer.

Preferably, there is provided a biodegradable resin composition including 40-70 wt % of polyethylene, 15-30 wt % of a biodegradable resin, and 10-30 wt % of at least one selected from polybutylene adipate terephthalate and maleic anhydride copolymer.

When the amount of the polyethylene is greater than 70 wt %, there is a problem in biodegradability, and when the amount of the polyethylene is less than 40 wt %, there is a limitation in providing excellent mechanical properties that can be provided by conventional plastics. When the amount of the biodegradable resin is greater than 30%, there is a problem in processability deterioration due to the occurrence of a large amount of fume and die build-up, and when the amount of the biodegradable resin is less than 15%, it is disadvantageous in terms of biodegradability and cost reduction aspects. When the amount of at least one selected from polybutylene adipate terephthalate and maleic anhydride copolymer is greater than 40%, there is a limitation in compatibility with polyethylene, and when the amount of at least one selected from polybutylene adipate terephthalate and maleic anhydride copolymer is less than 10 wt %, the effect of improving compatibility and mechanical properties thereby is insignificant. Therefore, it can be confirmed that, when the combination of the three components is provided in the above range, remarkably improved mechanical properties can be provided with improved dispersibility and improved compatibility. This can be confirmed from the results of the embodiments and drawings to be described below.

According to an embodiment of the present invention, the polyethylene is provided by including at least one selected from high density polyethylene (HDPE), very-low-density polyethylene (VLDPE), low density polyethylene (LDPE), medium density polyethylene (MDPE), linear low density polyethylene (LLDPE), and ethylene-vinyl acetate copolymer (EVA). Preferably, linear low density polyethylene (LLDPE) may provide excellent impact resistance and durability.

According to an embodiment of the present invention, the polyethylene has a weight average molecular weight of 100,000 to 1,000,000, and preferably 100,000 to 300,000.

According to an embodiment of the present invention, the biodegradable resin may be provided by including at least one selected from thermoplastic starch (TPS), polylactic acid (PLA), polycaprolactone (PCL), polybutylene succinate (PBS), polyglycolic acid (PGA), polyhydroxyalkanoate (PHA), polyhydroxybutyrate (PHB), cellulose, and chitin. Preferably, thermoplastic starch (TPS) may be provided.

The polylactic acid, the polycaprolactone, the polybutylene succinate, and the polyglycolic acid are aliphatic polyesters, and have excellent biodegradability by microorganisms and provide properties such as biocompatibility. In particular, since the polyglycolic acid has excellent mechanical properties such as high strength and high heat resistance, polyglycolic is particularly widely used in medical applications.

The polyhydroxyalkanoate corresponds to polyester and has excellent biodegradability and excellent degradability under any conditions such as aerobic, anaerobic, and composting conditions. In addition, the polyhydroxybutyrate is a natural polyester, belongs to polyhydroxyalkanoate, and is a homopolymer in which D-3-hydroxy-butyric acid is linearly linked. The polyhydroxybutyrate provides biological functions such as starch or glycogen as an energy store synthesized in cells by a wide variety of bacteria.

The cellulose, the chitin, and the natural polymer-based polymers may be provided as eco-friendly materials due to their excellent biodegradability, easy supply, and non-toxic properties.

The thermoplastic starch is obtained from plants and refers to a granular material including two components, amylose and amylopectin. For example, the thermoplastic starch is provided by including at least one selected from rice starch, wheat starch, corn starch, sweet potato starch, potato starch, tapioca starch, cassava starch, and modified starches thereof. The modified starch may be provided as α-starch, acid-treated starch, oxidized starch, cationic starch, ester starch, ether starch, and the like, in which starch is physically or chemically treated. The starch has excellent biodegradability and includes amylose and amylopectin. Since glucose of amylose contains a hydroxy (—OH) group, the starch has hydrophilicity and hydrogen bonding.

According to an embodiment of the present invention, at least one selected from the polybutylene adipate terephthalate and the maleic anhydride copolymer is included, and this is a biodegradable resin and also acts as a compatibilizing agent. For example, the blend resin including polybutylene adipate terephthalate and maleic anhydride copolymer may be provided, and only the maleic anhydride copolymer resin may be provided, but the present invention is not limited thereto. These help to solve the problem of degradation of mechanical properties, which has been a problem with low compatibility.

In particular, the maleic anhydride copolymer is copolymerized with at least one selected from maleic anhydride, polybutylene adipate terephthalate (PBAT), polybutylene succinate adipate (PBSA), and polybutylene succinate (PBS). The copolymer may be prepared using an extruder by adding maleic anhydride (MA) to polybutylene adipate terephthalate (PBAT) and then including dicumyl peroxide as an initiator, but the present invention is not limited thereto.

The polybutylene adipate terephthalate (PBAT) refers to a polymer obtained through an ester reaction and a polycondensation reaction by using 1,4-butanediol (aliphatic glycol) and dimethyl terephthalate (aromatic component) as raw materials. The polybutylene succinate adipate (PBSA) refers to a synthetic resin in which the content of a copolymer of succinic acid, adipic acid, and 1,4-butanediol among the base polymer is 60% or more. In addition, the polybutylene succinate (PBS) refers to a polymer obtained through an ester reaction and a polycondensation reaction by using a 1,4-butanediol succinic acid as a raw material.

In the present invention, the maleic anhydride copolymer may be preferably maleic anhydride (MA-PBAT) copolymerized with polybutylene adipate terephthalate (PBAT). In general, polyolefins are non-polar in chemical nature. In spite of the advantages of chemical resistance to solvents, there is a problem in compatibility due to low kneading properties with polar thermoplastic starch, polybutylene adipate, and copolymers thereof. Therefore, by introducing maleic anhydride (MA-PBAT) copolymerized with polybutylene adipate terephthalate (PBAT), dispersibility can be improved and compatibility can be improved accordingly, thereby improving mechanical properties. In particular, it is expected that the introduction of the maleic anhydride copolymer, which acts as a biodegradable resin and a compatibilizing agent, will also have an effect on improving the low tensile strength and drop impact strength of the biodegradable resin. This can be confirmed from the results of the embodiments and drawings to be described below.

According to an embodiment of the present invention, the biodegradable resin composition has a weight average molecular weight of 10,000 to 100,000, and preferably 20,000 to 50,000.

According to an embodiment of the present invention, a melting temperature of the biodegradable resin composition is 100° C. to 130° C., and a melt index of the resin composition is 0.01-10 g/10 min at 2.16 kg at 190° C. based on ASTM D1238. The melting temperature may be measured by differential scanning calorimetry (DSC) or dynamic mechanical analysis (DMA), which is a conventional measurement method, and the melt index (MI) is measured based on ASTM D1238.

According to an embodiment of the present invention, there is provided a biodegradable film including the biodegradable resin composition.

The film may be applied to at least one selected from industrial films, food films, agricultural films, and daily life films. Since dispersibility is improved, compatibility can be improved, and thus mechanical properties can be improved. In particular, it is possible to provide excellent mechanical properties such as tensile strength, elongation, tear strength, and drop impact strength.

According to an embodiment of the present invention, after the film is used, the film may be composted at a facility with certain conditions. In addition, it is possible to provide an advantage of minimizing the emission of harmful substances, such as dioxins, because the amount of heat generated is low even when inevitably burned.

According to an embodiment of the present invention, the film may have a thickness of 1-50 μm, preferably 20-40 μm, and preferably 30 μm.

On the other hand, the method for producing the biodegradable resin composition, including the composition, is as follows. In addition, the same description as the above-described resin composition may be applied, and redundant descriptions will be omitted.

According to an embodiment of the present invention, there is provided a biodegradable resin composition including 10-70 wt % of polyethylene, 10-60 wt % of a biodegradable resin, and 10-50 wt % of at least one selected from polybutylene adipate terephthalate and maleic anhydride copolymer. Preferably, there is provided a biodegradable resin composition including 40-70 wt % of polyethylene, 15-30 wt % of a biodegradable resin, and 10-30 wt % of at least one selected from polybutylene adipate terephthalate and maleic anhydride copolymer. In this case, the maleic anhydride copolymer may be preferably maleic anhydride (MA-PBAT) copolymerized with polybutylene adipate terephthalate (PBAT).

According to an embodiment of the present invention, the melt blending is provided using at least one selected from an extruder, a kneader, a Brabender Plasticorder, a mixing roll, and a mixer.

According to an embodiment of the present invention, the extruder is provided using one or more selected from a single-screw extruder, a twin-screw extruder, and a single-screw and twin-screw extruder. Preferably, the twin-screw extruder may provide excellent kneading properties and easy processability.

According to an embodiment of the present invention, the process may be performed by optimizing process conditions according to various raw materials to be input in the melt blending. A melting temperature may be in a range of 100° C. to 300° C., and preferably 160° C. to 210° C., and a rotating speed of the extruder screw may be in a range of 40 rpm to 700 rpm, and preferably 100 rpm to 200 rpm.

According to an embodiment of the present invention, it is possible to manufacture a compression molded film or a blown film by extruding through the extruder.

The invention claimed is:

1. A biodegradable resin composition comprising a polyethylene in an amount of 50 wt % to 70 wt %, a biodegradable resin in an amount of 15-30 wt %, and a maleic anhydride copolymer in an amount of 10-30 wt %, each based on a total weight of the biodegradable resin composition,
  wherein the maleic anhydride copolymer is a copolymer of maleic anhydride with at least one selected from polybutylene adipate terephthalate (PBAT), polybutylene succinate adipate (PBSA), and polybutylene succinate (PBS).

2. The biodegradable resin composition of claim 1, wherein the polyethylene comprises at least one selected from high density polyethylene (HDPE), low density polyethylene (LDPE), medium density polyethylene (MDPE), linear low density polyethylene (LLDPE), and ethylene-vinyl acetate copolymer (EVA).

3. The biodegradable resin composition of claim 1, wherein the biodegradable resin comprises at least one selected from thermoplastic starch (TPS), polylactic acid (PLA), polycaprolactone (PCL), polybutylene succinate (PBS), polyglycolic acid (PGA), polyhydroxyalkanoate (PHA), polyhydroxybutyrate (PHB), cellulose, and chitin.

4. The biodegradable resin composition of claim 3, wherein the thermoplastic starch comprises at least one selected from rice starch, wheat starch, corn starch, sweet potato starch, potato starch, tapioca starch, cassava starch, and modified starches thereof.

5. The biodegradable resin composition of claim 1, wherein the polyethylene has a weight average molecular weight of 100,000 to 300,000.

6. The biodegradable resin composition of claim 1, wherein a melting temperature of the biodegradable resin composition is 100° C. to 130° C., and a melt index of the biodegradable resin composition is 0.01-10 g/10 min at 2.16 kg at 190° C. based on ASTM D1238.

7. A biodegradable film comprising the biodegradable resin composition according to claim 1.

8. The biodegradable film of claim 7, wherein the film is applicable to at least one selected from industrial films, food films, agricultural films, and daily life films.

9. The biodegradable film of claim 7, wherein the film has a thickness of 1-50 μm.

10. A method for producing a biodegradable resin composition, said biodegradable resin composition comprising a polyethylene in an amount of 50 wt % to 70 wt %, a biodegradable resin in an amount of 15-30 wt %, and a maleic anhydride copolymer in an amount of 10-30 wt %, each based on a total weight of the biodegradable resin composition, wherein the maleic anhydride copolymer is a copolymer of maleic anhydride with at least one selected from polybutylene adipate terephthalate (PBAT), polybutylene succinate adipate (PBSA), and polybutylene succinate (PBS), the method comprising:

providing a mixture of the polyethylene, the biodegradable resin, and the maleic anhydride copolymer, and subject to the mixture melt blending to produce the biodegradable resin composition.

11. The method of claim 10, wherein the melt blending is carried out at 160° C. to 210° C.

12. The method of claim 10, wherein the melt blending uses at least one selected from an extruder, a kneader, a Brabender Plasticorder, a mixing roll, and a mixer.

13. The method of claim 12, wherein the extruder uses one or more selected from a single-screw extruder, a twin-screw extruder, and a single-screw and twin-screw extruder.

\* \* \* \* \*